United States Patent
Kobylarz

(10) Patent No.: US 9,486,107 B2
(45) Date of Patent: Nov. 8, 2016

(54) BREWER WITH AIR EVACUATION

(75) Inventor: Robert J. Kobylarz, Springfield, IL (US)

(73) Assignee: Bunn-O-Matic Corporation, Springfield, IL (US)

(*) Notice: Subject to any disclaimer, the term of this patent is extended or adjusted under 35 U.S.C. 154(b) by 1272 days.

(21) Appl. No.: 11/855,868

(22) Filed: Sep. 14, 2007

(65) Prior Publication Data

US 2008/0072766 A1    Mar. 27, 2008

Related U.S. Application Data

(60) Provisional application No. 60/825,613, filed on Sep. 14, 2006.

(51) Int. Cl.
*A47J 31/44*  (2006.01)
*A47J 31/60*  (2006.01)
*A47J 31/057* (2006.01)
*A47J 31/04*  (2006.01)

(52) U.S. Cl.
CPC ............ *A47J 31/60* (2013.01); *A47J 31/0576* (2013.01); *A47J 31/04* (2013.01)

(58) Field of Classification Search
CPC .. A47J 31/04–31/047; A47J 31/057–31/0576; A47J 31/60
USPC ............... 99/279–283, 300, 301, 302 R, 307
See application file for complete search history.

(56) References Cited

U.S. PATENT DOCUMENTS

| | | | |
|---|---|---|---|
| 2,894,109 A * | 7/1959 | Kendon | 392/451 |
| 3,443,508 A * | 5/1969 | Reynolds et al. | 99/282 |
| 3,490,356 A * | 1/1970 | Peterson et al. | 99/300 |
| 5,337,652 A * | 8/1994 | Fischer et al. | 99/282 |
| 5,375,508 A * | 12/1994 | Knepler et al. | 99/280 |
| 5,647,055 A * | 7/1997 | Knepler | 392/451 |
| 7,523,695 B2 * | 4/2009 | Streeter et al. | 99/305 |
| 2006/0011068 A1 * | 1/2006 | Spencer | 99/307 |
| 2006/0090653 A1 * | 5/2006 | McDuffie et al. | 99/279 |
| 2006/0196363 A1 * | 9/2006 | Rahn | 99/279 |
| 2007/0181004 A1 * | 8/2007 | Hale | 99/279 |

OTHER PUBLICATIONS

Definition of a check valve, Wikipedia Encyclopedia, on line search on Jul. 2013.*

* cited by examiner

*Primary Examiner* — Sang Y Paik
(74) *Attorney, Agent, or Firm* — Barnes & Thornburg LLP

(57) ABSTRACT

A brewing system which uses an air pump to evacuate a dispensing line and a method of brewing in which a brewer includes an air pump to provide pressurized air at least at the end of a brew cycle to help evacuate moisture from a dispensing line. The brewing system includes a heated water reservoir which retains heated water for dispensing and a dispense line through which the water is dispensed. A vent is coupled to the reservoir. A controllable air pump communicates with the reservoir to controllably add air to the reservoir to drive water out of the reservoir. The vent is closed when the pump is used to add air to the system to allow for a build-up of air pressure in the reservoir and out through the dispense line. The controllable air pump controllably dispenses air into the upper portion. Both the air vent valve and air pump are controllably coupled to a controller.

14 Claims, 2 Drawing Sheets

BREWER WITH AIR EVACUATION

CROSS REFERENCE TO RELATED APPLICATIONS

This patent application claims the benefit of priority under 35 U.S.C. §119(e) to U.S. Provisional Application No. 60/825,613, filed Sep. 14, 2006. The disclosure set forth in the referenced provisional application is incorporated herein by reference in its entirety, including all information as originally submitted to the United States Patent and Trademark Office.

BACKGROUND

By way of background, a variety of beverage brewing machines have been developed. Many of these brewers include a heated water reservoir in which water is introduced to the reservoir for heating and retained in the reservoir until it is necessary to dispense. Water is dispensed from the reservoir typically at an upper end so that the most heated water retained in the reservoir is dispensed first. A dispensed tube is connected to the reservoir at one end and a spray head at an opposite end. Water flows into the reservoir generally through a lower portion of the reservoir and displaces water therein for dispensing through the spray tube. Typically the water flow continues until water ceases to enter the reservoir. At this point the dispense tube drains out and the brewing cycle is completed.

One of the methods for controlling outlet from the reservoir is the use of a control valve communicating with the dispense tube. A complication with such control valves that it may be subjected to clogging or other complications as a result of lime build up. Lime build up occurs as minerals such as lime precipitate or evaporate out of the water in the reservoir. This process is enhanced by the heating of the water in the reservoir. The accumulation of lime is detrimental such that it can block or at least slow down the flow of water from the reservoir to the spray head. In order to try to eliminate this complication periodic cleaning of the dispense tube is required to remove the lime.

SUMMARY

The present disclosure overcomes problems associated with beverage systems by providing a system which eliminates water which might otherwise result in evaporation and accumulation of mineral deposits as well as precipitation of mineral deposits from water. Additionally, this system overcomes problems associated with moisture retained in brewing substance.

BRIEF DESCRIPTION OF DRAWINGS

The present disclosure will be described hereafter with reference to the attached drawings which are given as a non-limiting example only, in which.

Figure 1:
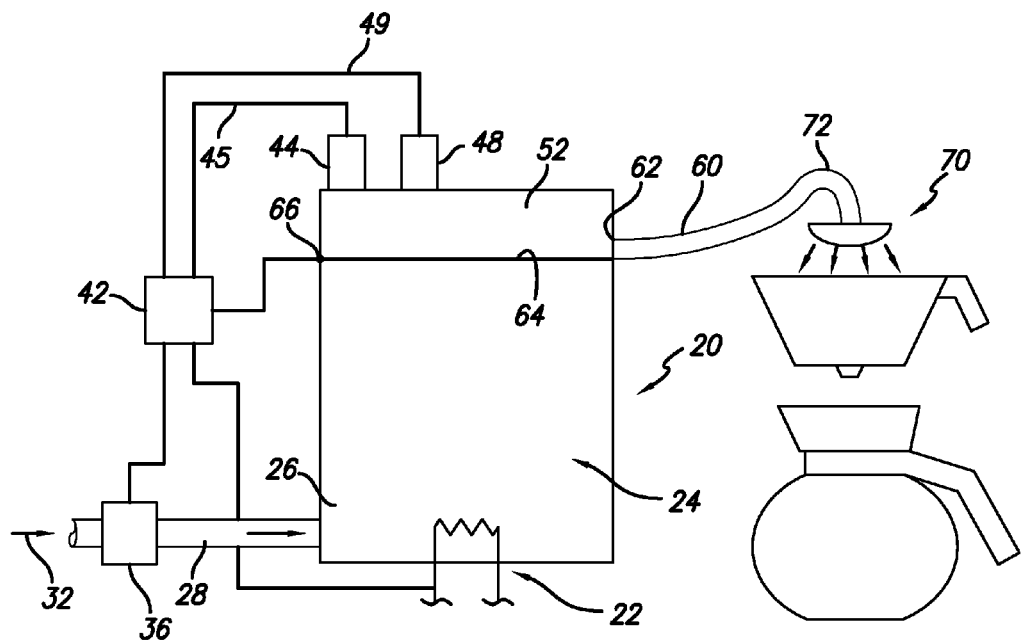
FIG. 1 is a schematic illustration showing a simplified diagrammatic embodiment of the brewing system as disclosed.

The exemplification set out herein illustrates embodiments of the disclosure that is not to be construed as limiting the scope of the disclosure in any manner.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description and illustrated in the drawings.

FIG. 1 provides a schematic illustration relating to the present disclosure. This illustration is intended for use with a heated water system and more particularly may be used with a heated water system which is used for producing a brewed beverage. It should be understood that the present disclosure is not limited to the system, but is intended to be broadly interpreted to include all applications such as described in detail herein and which might be developed based on the disclosure provided herein.

While the term "heated" may be used throughout this disclosure, the term is to be broadly interpreted to include all forms of water or dilution liquid of any temperature, generally in which the water has been heated. The term heated includes the term "hot" such that one might consider the water to be hot based on the numerical temperature. Generally, the temperature of the water is below or at the relevant boiling temperature (212 degrees F. at sea level) above which the water will generally transform to steam. The term heated is used to distinguish from the term unheated such that unheated water is generally introduced into the unheated water reservoir during the brewing cycle. In or near the heated water reservoir, the water is heated resulting in heated water.

Terms including beverage, brewed, brewing, and brewed beverage as may be used herein are intended to be broadly defined as including, but not limited to the brewing or making of tea, coffee and any other beverages or food substances that will benefit from the present disclosure. This broad interpretation is also intended to include, but is not limited to, any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze-dried or other forms of materials including liquid, gel, crystal or other form of beverage or food materials currently in existence or to be developed to obtain a desired beverage or food product. This broad interpretation is intended to include, without limitation, at least funnel and filter-type, packet or pouch-type, pod-type or other prepackaged or unpackaged forms of retaining and brewing a beverage or making of a food product. The terms heated water may be interpreted as hot water, and generally refers to adding energy to water to heat the water above ambient temperature.

While the disclosure shows an illustration of a brewer as described above, it is intended and understood that the term brewer is to be broadly interpreted to include brewers of any configuration including that as shown as well as, by way of example but not limitation, single cup or pod brewers. Pod brewers are brewers which retain a pod or prepackaged beverage product and deliver to or force water through the pod to brew a beverage. Many pod brewers produce one or two cups of beverage instead of 4-12 cups as is produced by many other brewers. Pod brewers may be configured consistent with the teachings of this disclosure to be connected to a pressurized water line and provide line pressure brewing. The teachings of this disclosure are intended to be broadly interpreted and applied to a variety of brewer sizes, styles and configurations consistent with the principals disclosed herein.

With reference to FIG. 1, the present disclosure includes a heated water reservoir which retains heated water for dispensing. The heated water reservoir 20 includes a heater 22 which heats water 24 in the reservoir 20. A fill line 28 is connected to the reservoir in a lower area 26 to dispense water 32 into the reservoir. A controllable valve 36 is attached to the inlet line to controllably add water to the reservoir. The controllable valve 36 is connected to a controller 42. A vent 44 is coupled to the reservoir. A controllable air pump 48 communicates with the reservoir to controllably add air to an upper portion 52 of the reservoir and controllable, indirectly drive water out of the reservoir. The vent 44 allows air to be vented from the upper portion 52. The vent 44 is open when water is being dispensed to vent the upper portion 52. The vent 44 is closed when the pump 48 is used to add air to the system. Closing the vent 44 allows for a build-up of air pressure in the upper portion 52 and out through the dispense line 60. The controllable air pump 48 controllably dispenses air into the upper portion 52. Both the air vent valve 44 and air pump 48 are controllably coupled to the controller 42.

A dispense line 60 communicates with the upper portion 52 of the reservoir 20. An entry end 62 coupled to the reservoir is generally positioned at a level 64 maintained by a level detector 66. The dispense line 60 curves upwardly as it approaches the spray head 70 forming an elbow 72. The elbow raises the flowpath to the point above the water level 64 so that during a dispense cycle at the conclusion of the dispense cycle a siphon is not created. This also allows water to flow back into the reservoir at the end of a brew cycle.

The dispensing system allows the air pump to operate and vent to close the upper portion 52 so as to allow a pulse of air to be dispensed through the dispense line 60. The air helps to evacuate water in the dispense line 60 and sprayhead 70. If water can be removed from these structures at the end of a brew cycle, it can help eliminate or at least slow the accumulation of lime in the system.

Figure 2:
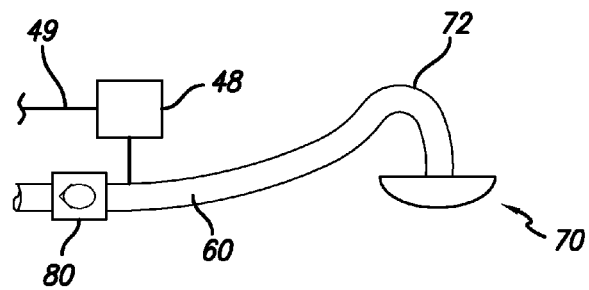
FIG. 2 is an embodiment in which a pump is connected to a dispense line of the system with a check valve being positioned upstream from the pump.

In an alternate embodiment, see FIG. 2, the pump 48 can be connected to the dispense line 60 with a check valve 80 being positioned upstream from the air pump. This allows the air pump to emit a pulse of air through the dispense line 60 with the check valve 80 preventing back flow into the heated water reservoir.

Figure 3:
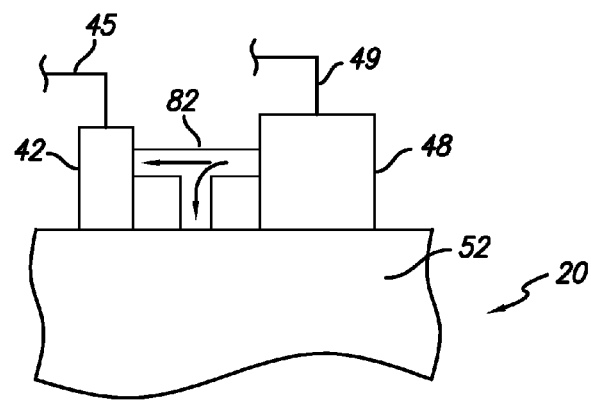
FIG. 3 is an embodiment of an air pump and control valve connected in a "T" configuration.

Additionally, with reference to FIG. 3, the air pump and control valve 48, 42 may be connected by a "T" passage 82 which communicates with the upper portion 52 of the reservoir 20. This eliminates multiple openings and reduces the openings in the reservoir to a single opening.

During a brew cycle, the water is dispensed into the reservoir such as through the dispense line 60. When the brew cycle has been completed the air pump 48 emits a pulse of air to clear the dispense line. This system may also use the air pump to control the outflow of water from the reservoir. In this regard, the reservoir is filled through the inlet line. The pressure on the inlet line is greater than the pressure created by the air pump. The air pump pressurizes the upper area 52 to cause the system to push water out of the reservoir.

Alternatively, the system water flow can be operated by control of the inlet line. Regardless of the method for dispensing water through the outline line, an air pulse is provided to generally clear water from the dispense line 60. While the dispense line does not need to be completely dried, clearing water from the dispense line is useful to minimize the accumulation of lime in the dispense line.

Figure 4:
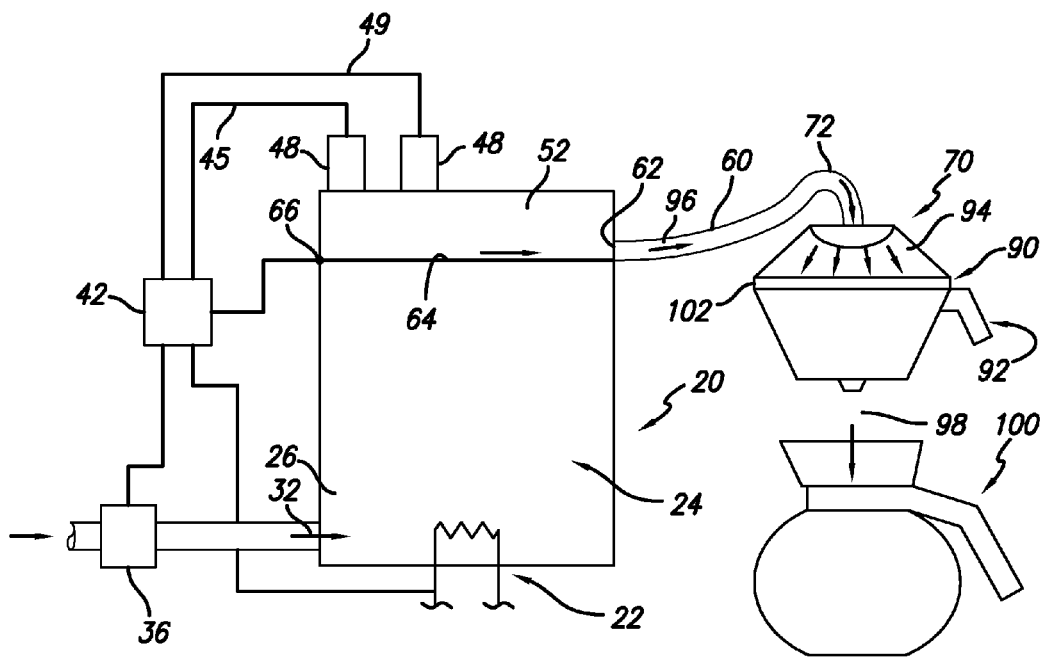
FIG. 4 is an embodiment in which a sealing device is provided relative to a brewing substance holder and a flow path of air to facilitate controlled dispensing of air through the flow path and through the brewing substance holder, in which air is driven through at least part of the brewing substance to help reduce moisture content thereof.

With reference to FIG. 4, another embodiment is shown in which a sealing device 90 is provided at an interface between the spray head 70 and a brewing substance holder 92. The sealing device 90 allows a seal to be formed between the brewing substance holder 92 and an air pass 94. Sealing in this manner allows the pulse of air 96 emitted through the dispense line 60 to flow to the brewing substance holder 92. As the brewing substance holder 92 retains a quantity of moist or saturated brewing substance at the end of the brew cycle, this air flow may help to reduce or eliminate moisture from the brewing substance.

By way of example, when a user operates the system, brewing substance is placed in the brewing substance holder 92. The substance holder 92 is then placed on the machine or system with a rim 102 of the holder 92 abutting the sealing device 90. The sealing device may be in the form of a gasket, pad or other surface which allows for attached of the holder 92 in feeling of a portion of the holder such as the rim or mouth 102 against the device 90.

During the brewing cycle, water is dispensed through the dispense line 60 and through the spray head 70. Water emitted from the spray head falls or is sprayed into the brewing substance holder to saturate brewing substance retained therein. As a result, the brewing substance is infused and a brewed beverage 98 flows into a receptacle or carafe 100.

At the end of the brew cycle a pulse of air is emitted by the pump 48. The pulse of air mentioned throughout this application may be a pulse or a relatively continuous stream of air. The pump 48 can be controlled by the controller 42 to provide an appropriate pulse or stream of air. In some applications a stream of air may be necessary to appropriately pressurize the upper portion 52 of the reservoir 20 to provide sufficient air flow 96 through the dispense line 60 to have an effect on the volume defined by the holder 92. In other words, the pump 48 may need to pump for a sufficiently long period of time to pressurize the upper portion 52 and the holder 92 to have an effect on draining moisture or liquid from the brewing substance. However, at the end of such a purging cycle by the air flow, the brewed beverage 98 which might otherwise be retained in the brewing substance is dispensed into the carafe 100.

The invention claimed is:

1. A brewing system for brewing a beverage using a beverage making substance, the brewer comprising:
   a controller for controlling the beverage brewer;
   a single reservoir for retaining heated water for dispensing, the reservoir having an upper portion and a lower area;
   a heater coupled to the controller and positioned in proximity to the lower area of the reservoir for controllably heating the water in the reservoir;

a controllable water fill line communicating with the lower area of the reservoir for controllably introducing water to the reservoir;

a controllable valve means for controlling the volume of water introduced to the reservoir from the water fill line, the controllable valve means being coupled to the water fill line and to the controller;

a dispense line communicating with the upper portion of the reservoir for controllably dispensing heated water from the reservoir;

a spray head coupled to the dispense line for distributing water over a brewing substance retained in a brewing substance holder;

a check valve means coupled to the dispense line to prevent water in the dispense line from returning to the reservoir; and a controllable air pump coupled to the controller and communicating with at least one of the upper portion of the reservoir and the dispense line for providing air to the brewer to clear water from at least the dispense line at the end of a brewing cycle.

2. The brewing system of claim 1, further comprising the air pump communicating directly with the upper portion of the reservoir to introduce air into the upper portion of the reservoir for driving water out of the dispense line at the end of a brewing cycle.

3. The brewing system of claim 2, further comprising a controllable vent valve coupled to the controller and communicating directly with the upper portion of the reservoir, the controller operating the vent closed during at least a portion of the time the pump is operated to provide some back pressure to drive water out of the dispense line at the end of a brewing cycle.

4. The brewing system of claim 2, further comprising the dispense line having at least a portion being oriented at an upward slope away for the reservoir, a spray head spaced from the reservoir and coupled to a distal end of the dispense line.

5. The brewing system of claim 1, further comprising the air pump communicating directly with the dispense line to introduce air into the dispense line for driving water out of the dispense line and the spray head at the end of a brewing cycle.

6. The brewing system of claim 5, the check valve means facilitating driving of water out through the dispense line when the air pump is operated at the end of a brewing cycle.

7. The brewing system of claim 5, further comprising the dispense line having at least a portion being oriented at an upward slope away for the reservoir, a spray head spaced from the reservoir and coupled to a distal end of the dispense line.

8. The brewing system of claim 1, further comprising providing pulsed air means for effecting draining liquid from the brewing substance.

9. The brewing system of claim 1, further comprising the controllable air pump is coupled to the dispense line at a location between the check valve means and the spray head.

10. The brewing system of claim 1, further comprising the check valve means is coupled to the dispense line at a location between the controllable air pump and the reservoir.

11. A method of brewing in which a beverage brewer includes an air pump to provide pressurized air at the end of a brew cycle to help evacuate moisture from a dispensing line;

the brewer of the type including a controller for controlling the brewer functions and operation of the brewer during a brewing cycle, a single reservoir for retaining heated water for dispensing, the reservoir having an upper portion and a lower area, a heater coupled to the controller and positioned in proximity to the lower area of the reservoir, a controllable water fill line communicating with the lower area of the reservoir, a controllable valve coupled to the water fill line and to the controller, a dispense line communicating with the upper portion of the reservoir for dispensing heated water from the reservoir, a check valve means coupled to the dispense line to prevent water in the dispense line from returning to the reservoir, a spray head coupled to the dispense line for distributing water over a brewing substance retained in a brewing substance holder, a sealing device sealing space between the spray head and the brewing substance holder, and a controllable air pump coupled to the controller and communicating with at least one of the upper portion of the reservoir and the dispense line;

the method comprising:

controllably heating the water in the reservoir;

controllably introducing water to the reservoir to controllably dispense water to the brew substance during a brew cycle;

controlling the volume of water introduced to the reservoir from the water fill line; and providing air from the controllable air pump to the at least one of the upper portion of the reservoir, the space sealed by the sealing device and the dispense line at the end of a brewing cycle to clear water from the dispense line and the spray head and to effect liquid removal from the brewing substance such that the check valve means prevents water in the dispense line from returning to the reservoir at the end of a brewing cycle.

12. A brewing system for brewing a beverage using a brewing substance, the brewer comprising:

a controller for controlling the beverage brewer;

a single reservoir for retaining heated water for dispensing, the reservoir having an upper portion and a lower area;

a heater coupled to the controller and positioned in proximity to the lower area of the reservoir for controllably heating the water in the reservoir;

a controllable water fill line communicating with the lower area of the reservoir for controllably introducing water to the reservoir;

a controllable valve means for controlling the volume of water introduced to the reservoir from the water fill line, the controllable valve means being coupled to the water fill line and to the controller;

a dispense line communicating with the upper portion of the reservoir for controllably dispensing heated water from the reservoir;

a spray head coupled to the dispense line for distributing water over a brewing substance retained in a brewing substance holder;

a check valve means coupled to the dispense line to prevent water in the dispense line from returning to the reservoir;

a sealing device means for sealing space between the spray head and the brewing substance holder and for enabling a pulse of air through the dispense line to reduce moisture in the brewing substance; and a controllable air pump coupled to the controller and communicating with at least one of the upper portion of the reservoir and the dispense line for providing air to the brewer to clear water from at least the dispense line at the end of a brewing cycle and for providing air to the space sealed by the sealing device to effect liquid removal from the brewing substance.

13. The brewing system of claim 12, further comprising the controllable air pump is coupled to the dispense line at a location between the check valve means and the spray head.

14. The brewing system of claim 12, further comprising the check valve means is coupled to the dispense line at a location between the controllable air pump and the reservoir.

* * * * *